United States Patent
Murata et al.

(10) Patent No.: US 7,277,369 B2
(45) Date of Patent: Oct. 2, 2007

(54) OPTICAL DISK CAPABLE OF DISABLING INCOMPATIBLE RECORDER

(75) Inventors: Morihiro Murata, Hamamatsu (JP); Akio Hirai, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 599 days.

(21) Appl. No.: 10/230,573

(22) Filed: Aug. 29, 2002

(65) Prior Publication Data

US 2003/0058766 A1 Mar. 27, 2003

(30) Foreign Application Priority Data

Aug. 29, 2001 (JP) ............................. 2001-260158

(51) Int. Cl.
*G11B 7/0045* (2006.01)
*G11B 7/24* (2006.01)
(52) U.S. Cl. .................................. 369/47.53; 369/275.3
(58) Field of Classification Search ...................... None
See application file for complete search history.

(56) References Cited

U.S. PATENT DOCUMENTS

| | | | | |
|---|---|---|---|---|
| 5,161,144 A | * | 11/1992 | Takeuchi et al. | 369/53.32 |
| 5,289,450 A | * | 2/1994 | Mizumoto et al. | 369/53.37 |
| 5,559,778 A | * | 9/1996 | Inokuchi et al. | 369/53.24 |
| 5,706,271 A | * | 1/1998 | Hashimoto | 369/53.37 |
| 6,052,347 A | * | 4/2000 | Miyata | 369/47.53 |
| 6,438,084 B2 | * | 8/2002 | Kawashima et al. | 369/53.22 |
| 6,633,534 B1 | * | 10/2003 | Tosaki et al. | 369/275.3 |
| 6,765,851 B2 | * | 7/2004 | Kawashima et al. | 369/275.4 |
| 6,891,784 B2 | * | 5/2005 | Yanagawa et al. | 369/47.22 |
| 6,917,574 B2 | * | 7/2005 | Kawashima | 369/59.26 |

FOREIGN PATENT DOCUMENTS

WO 01/27922 4/2001

OTHER PUBLICATIONS

Kazukiko Honda□□Jan. 10, 2002□□U.S. Appl. No. 09/863,479.*
European Patent Office, "Search Report," (Nov. 17, 2006).

* cited by examiner

*Primary Examiner*—William Korzuch
*Assistant Examiner*—Parul Gupta
(74) *Attorney, Agent, or Firm*—Pillsbury Winthrop Shaw Pittman LLP

(57) ABSTRACT

An optical disk is compatible with one type of a recording apparatus which is designed to irradiate an optical beam onto the optical disk to form pits along the pregroove for actual recording of information. The optical disk is incompatible with another type of a recording apparatus which is designed to successively record the times of the test recording into a count area of the conventional optical disk. The optical disk has a test area corresponding to the test area of the conventional optical disk and a prepit area corresponding to the count area of the conventional optical disk, the prepit area being provisionally formed with prepits at least in a section corresponding to the predetermined section of the count area of the conventional optical disk so as to inhibit the other type of recording apparatus from conducting the test recording.

6 Claims, 11 Drawing Sheets

OPTICAL DISK CAPABLE OF DISABLING INCOMPATIBLE RECORDER

BACKGROUND OF THE INVENTION

1. Technical Field of the Invention

The present invention relates to an optical disk which is irradiated with a laser beam to thereby record information, an optical disk recording apparatus which irradiates the optical disk with the laser beam and records information, and a control method and control program of the recording apparatus.

2. Related Art

As portable recording mediums for recording a large volume of data, recordable optical disks such as a compact disc-recordable (CD-R) and CD-rewritable (CD-RW) are used, and these optical disks comply with provisions of Orange Book as written standards of the recordable optical disk.

Additionally, for disk drive apparatuses of recording information in an optical disk, such as a CD-R drive, there is much demand for increasing of a recording speed. However, the use of the optical disk in accordance with the current standard is a factor for hindering the speed from increasing, and the change of the standard of the optical disk is sometimes required in order to realize the increasing of the recording speed.

However, when the standards of the optical disk such as CD-R are changed as described above, and the information is recorded in the CD-R manufactured in accordance with a new standard by the CD-R drive designed in accordance with an old standard, an appropriate recording of information cannot be performed with high possibility because of alteration in information write strategy due to the change of the standards. Therefore, when the CD-R conforming to new standards is irradiated with a laser beam and the recording is performed by the CD-R drive conforming to the old standards, the recording may appear successful to a user of the drive, but in actual the appropriate recording may not be performed due to discrepancy between the old and new standards. Such a CD-R possibly creates a trouble and fails to reproduce the recorded information, even though the recording has been performed without trouble problem.

SUMMARY OF THE INVENTION

The present invention has been developed in consideration of the above-described circumstances, and an object thereof is to provide an optical disk capable of inhibiting an inappropriate recording from being performed by a recording apparatus conforming to old standards, an optical disk recording apparatus capable of appropriately recording information in optical disks conforming to either of new and old standards, and a control method and control program of such a recording apparatus.

To solve the problem, according to the present invention, there is provided an optical disk having a circular shape formed with a pregroove along a circumferential direction of the circular shape. The inventive optical disk is compatible with one type of a recording apparatus which is designed to irradiate an optical beam onto the optical disk to form pits along the pregroove for actual recording of information. The inventive optical disk is incompatible with another type of a recording apparatus which is designed to conduct test recording before actual recording on a test area of a conventional optical disk repeatedly up to a predetermined number of times and which is designed to successively record the times of the test recording into a count area of the conventional optical disk such that the final time may be recorded in a predetermined section of the count area. The inventive optical disk has a test area corresponding to the test area of the conventional optical disk and a prepit area corresponding to the count area of the conventional optical disk, the prepit area being provisionally formed with prepits at least in a section corresponding to the predetermined section of the count area of the conventional optical disk so as to inhibit said another type of the recording apparatus from conducting the test recording.

According to the inventive constitution, when the inventive optical disk is set in a conventional recording apparatus for performing the test recording with respect to the optical disk defined by a new standard, the predetermined section of the count area corresponding to the maximum number of the test times is filled with the prepits as dummy count information, and the recording apparatus judges from the dummy information that the test recording cannot be performed any more. Therefore, the inappropriate recording can be prevented from being performed by the conventional recording apparatus conforming to an old standard.

Moreover, according to the present invention, there is provided an apparatus constructed for performing an actual recording of information by irradiating an optical beam onto an optical disk which may be manufactured according to either of a first standard and a second standard different from the first standard, and constructed for performing a test recording before the actual recording so as to determine an optimal power of the optical beam which may vary between the first standard and the second standard. The inventive apparatus comprises a detecting section that detects whether the optical disk is manufactured according to the first standard or the second standard, a first control section that executes the test recording in accordance with the first standard to determine the optimal valve of the optical beam under the first standard, a second control section that executes the test recording in accordance with the second standard to determine the optimal value of the optical beam under the second standard, and a selecting section that selectively activates the first control section when the first standard is detected from the optical disk and otherwise selectively activates the second control section when the second standard is detected from optical disk.

Furthermore, according to the present invention, there is provided a method of operating an apparatus constructed for performing an actual recording of information by irradiating an optical beam onto an optical disk which may be manufactured according to either of a first standard and a second standard different from the first standard, and constructed for performing a test recording before the actual recording so as to determine an optimal power of the optical beam which may vary between the first standard and the second standard. The inventive method is carried out by the steps of detecting whether the optical disk is manufactured according to the first standard or the second standard, executing the test recording in accordance with the first standard to determine the optimal valve of the optical beam under the first standard when the first standard is detected from the optical disk, and executing the test recording in accordance with the second standard to determine the optimal value of the optical beam under the second standard when the second standard is detected from optical disk.

Additionally, according to the present invention, there is provided a computer program for use in an optical recording apparatus designed for performing an actual recording of information by irradiating an optical beam onto an optical disk which may be manufactured according to either of a first standard and a second standard different from the first standard, and designed for performing a test recording before the actual recording so as to determine an optimal power of the optical beam which may vary between the first standard and the second standard. The inventive computer program is executable by a processor equipped in the optical recording apparatus for carrying out a control process comprising the steps of detecting whether the optical disk is manufactured according to the first standard or the second standard, conducting the test recording in accordance with the first standard to determine the optimal valve of the optical beam under the first standard when the first standard is detected from the optical disk, and conducting the test recording in accordance with the second standard to determine the optimal value of the optical beam under the second standard when the second standard is detected from optical disk.

According to the above-described inventive apparatus, the method and the computer program, it is judged whether the optical disk set in the optical disk recording apparatus conforms to the first standard or the second standard, and the appropriate test recording can be performed according to the judgement. Therefore, the performing of the inappropriate test recording in accordance with the standard different from that of the set optical disk can be inhibited, and the inappropriate recording can be prevented beforehand from being performed with respect to the optical disk.

DETAILED DESCRIPTION OF THE INVENTION

Embodiments of the present invention will be described hereinafter with reference to the drawings.

A. First Embodiment

Figure 1:
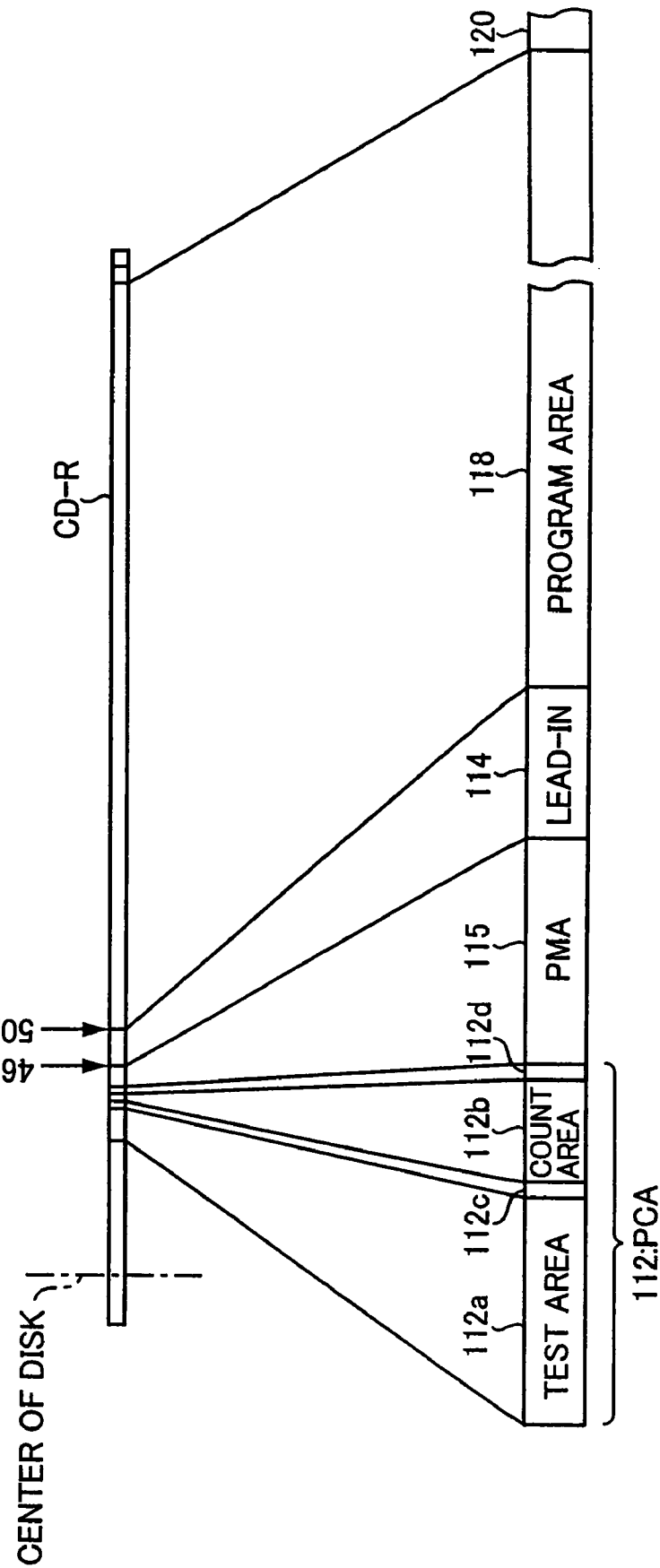
FIG. 1 is a diametric sectional view of an optical disk showing area divisions of CD-R according to a first standard.

A-1. CD-R According to First Standard, and OPC Processing with Respect to the CD-R First, prior to the description of a CD-R according to a first embodiment of the present invention, a CD-R prepared in accordance with a standard of Orange Book which is current at the time of filing the present application (Orange Book, Part III: CD-RW, Vol. 2: High Speed, Version 1.0; hereinafter referred to as a first standard) will be described. To record information in the CD-R conforming to the first standard, a CD-R drive obtains an optimum laser power for the recording into the CD-R, and performs the recording with the obtained laser power. That is, in the CD-R drive, a laser power optimization processing of obtaining an optimum laser power (hereinafter referred to as OPC: Optimum Power Control) is performed prior to the real recording. A detailed method of the OPC is defined in the above-described Orange Book as the standard of a recordable optical disk. In the following, a recording area of the CD-R according to Orange Book will first be described with reference to FIG. 1, and thereafter a processing by the CD-R drive in executing the OPC with respect to the CD-R will be described.

As shown in the drawing, for the CD-R, a section having a diameter of 46 to 50 mm is prepared as a lead-in area 114, and a program area 118 and residual area 120 for recording data are prepared on an outer peripheral side of the lead-in area. On the other hand, a program memory area (PMA) 115 is prepared in an inner peripheral side of the lead-in area 114, and a power calibration area (PCA) 112 is prepared on a further inner peripheral side.

A test area 112a, count area 112b, and spare areas 112c, 112d are prepared in the PCA 112. In the test area 112a, a test recording is performed prior to the real recording processing. Here, an area in which the test recording can be performed 100 times at most is prepared as the test area 112a, and an area for recording up to 100 pieces of eight-to-fourteen modulation (EFM) signals indicating a range of the test area 112a in which the test recording has been already performed is prepared in the count area 112b.

Figure 2:
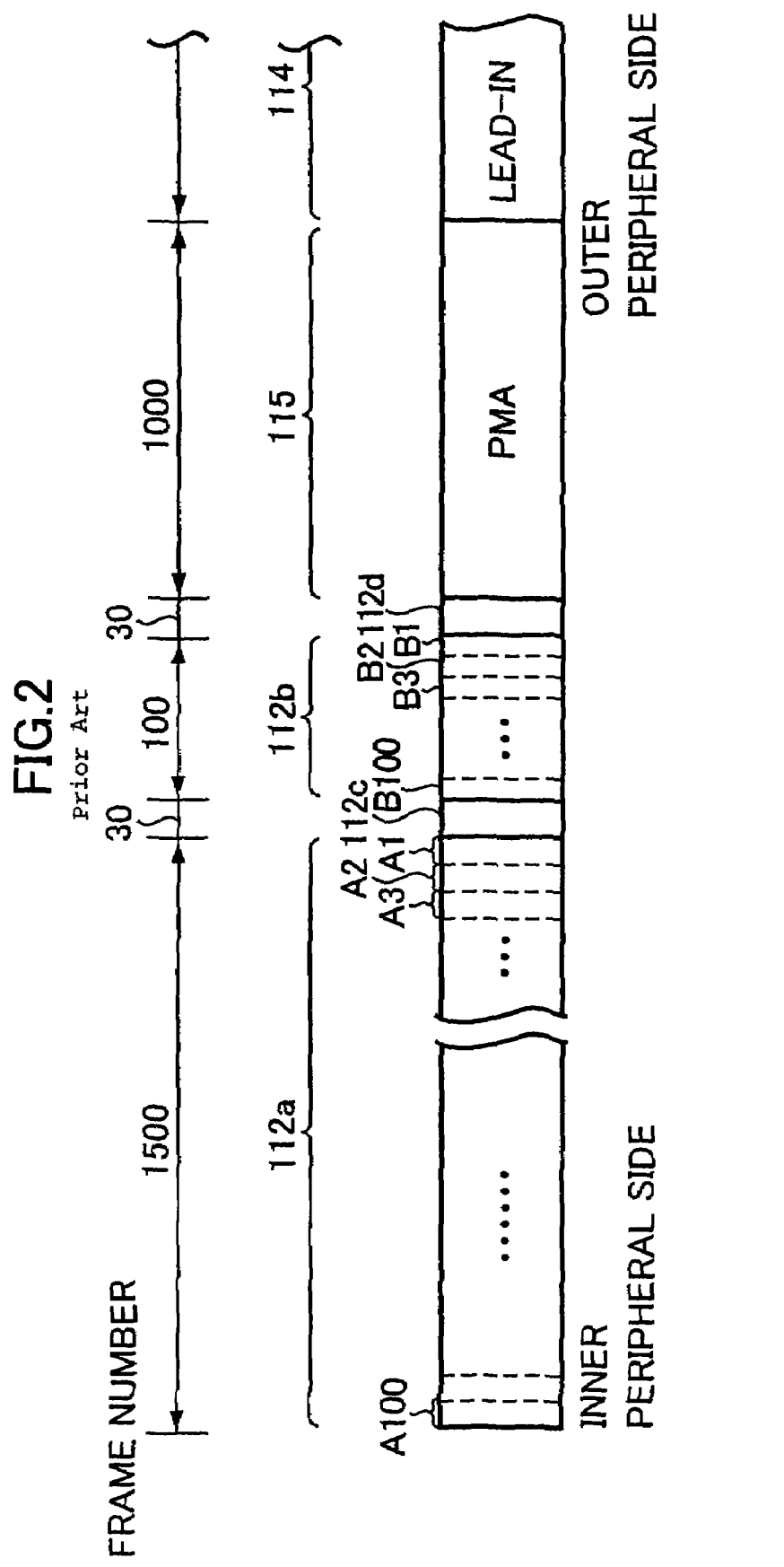
FIG. 2 is a diagram schematically showing an area constitution of PCA in the CD-R according to the first standard.

Here, FIG. 2 is a diagram showing a further detailed area structure of the PCA 112. As shown in the drawing, an area of 1500 frames is prepared on an innermost peripheral side of the CD-R as the test area 112a, and data is recorded in the area of 15 frames at one test recording by the CD-R drive. Here, among sections obtained by dividing the test area 112a every 15 frames, a first test recording is performed into an area A1 on an outermost peripheral side, a second test recording is performed with respect to an area A2 inwardly next to the area A2, and a third test recording is performed with respect to an area A3 located on the further inner peripheral side. Thereafter, the test recording is similarly performed with respect to each area of 15 frames on the inner peripheral side, and the last 100-th test recording is performed with respect to an area A100 of 15 frames located on the innermost peripheral side of the PCA 112.

The spare area 112c of 30 frames is prepared on the outer peripheral side of the test area 112a in the PCA 112. The count area 112b of 100 frames is prepared on the further outer peripheral side of the spare area 112c. When the first test recording ends by the CD-R drive, the EFM signal is written in a frame B1 on an outermost peripheral side of the count area 112b. After the second test recording ends, the EFM signal is written in a frame B2 inwardly next to the frame B1. After the third test recording ends, the EFM signal is written in a frame B3 positioned on the further inner peripheral side. Thereafter, every time the test recording is performed, the EFM signal is similarly written in each frame on the inner peripheral side. After the last 100-th test recording ends, the EFM signal is written in a frame B100 on the innermost peripheral side to thereby indicated that the test area is used up.

The spare area 112d of 30 frames is prepared on the further outer peripheral side of the count area 112b, and the PMA 115 is prepared on the outer peripheral side of the spare area 112d. The PMA 115 is used as a working area for recording information on a track in which data has been recorded, after the end of the recording of the information by the CD-R drive. An area of 1000 frames is the PMA 115, and the lead-in area 114 is prepared on the outer peripheral side. That is, the frame of the count area 112b in which the EFM signal is to be written after the end of 100 test recordings is positioned on the inner peripheral side spaced by 1130 frames from a start position of the lead-in area 114. The position of the test area 112a to start the final 100-th test recording is on the inner peripheral side spaced by 2660 frames from the start position of the lead-in area 114.

In the OPC processing prior to the real recording, the CD-R drive uses the PCA 112 in the CD-R with the above-described areas prepared therein to perform the test recording, and measures asymmetry of the reproduced signal in order to obtain an optimum value of the laser power. In the OPC processing, the CD-R drive controls an irradiation position of a laser beam emitted from an optical pickup (hereinafter referred to as the irradiation position), and initially seeks the position of the count area 112b on the innermost peripheral side as a target position. To move the irradiation position to the target position (here, the position of the count area 112b on the innermost peripheral side) in the CD-R drive, a control is executed which comprises: moving the irradiation position slightly toward the inner peripheral side from the target position; moving the irradiation position toward the outer peripheral side while reading the information recorded in the CD-R; and using the information to detect the target position. Here, information used in the seeking to the target position by the CD-R drive is absolute time information (=absolute position information) involved in pregroove (ATIP) information which can be obtained from a wobble signal extractable from a reflected light from a pregroove formed in the CD-R. For the absolute time information of the ATIP information, the start position of the lead-in area 114 is set to 0, and a position on the inner peripheral side of the position by 1130 frames is the innermost peripheral position of the count area 112b. Therefore, the CD-R drive judges the position in which the absolute time information indicating the span of 1130 frames is obtained as the innermost peripheral position of the count area 112b, and executes a position control. Moreover, the ATIP information is also used in adjusting the positions of the optical pickup such as the start position of each area described hereinafter. Furthermore, the seeking is started from the position on the inner peripheral side slightly from the target position, so that the target position is more accurately detected. In more detail, a runup section for synchronization with the ATIP information until the target position is sought is provided. Additionally, the ATIP is a known technique defined in Orange Book, and therefore detailed description thereof is omitted.

As described above, to move the irradiation position to the certain target position (here the innermost peripheral position of the count area 112b), the CD-R drive executes a control to start the seeking from the position on the inner peripheral side slightly shifted from the target position, the moves the irradiation position toward the outer peripheral side and detects the target position. Therefore, in the seeking where the innermost peripheral position of the count area 112b is the target position, the seeking is started toward the outer peripheral side from the frame on the innermost peripheral side of the count area 112b, that is, from the position on the inner peripheral side slightly (e.g., by 20 to 30 frames) shifted from the frame B100 in which the EFM signal is written after the end of the 100-th recording.

After the CD-R drive starts the seeking from the position on the inner peripheral side slightly shifted from the frame B100 as described above, it is detected whether or not the EFM signal is written in the frame B100. When the signal is written, the CD-R has been already performed with 100 test recordings therein, and the test recording cannot be performed any more. Therefore, the CD-R drive executes an error processing, and informs a user that the CD-R reaches the end of life. On the other hand, when the EFM signal is not written in the frame B100, it is judged whether or not the EFM signal is written in the next frame on the outer peripheral side of the frame B100. When the EFM signal is not written in the next frame, the judgment is performed with respect to a further outer-peripheral frame. For the count area 112b, the irradiation position is successively moved to the outer peripheral frames in this manner until the frame with the EFM signal written therein is detected. It is thus detected whether or not the EFM signal is written in each frame.

When it is detected that the EFM signal is written in a frame other than the frame B100, the frame then indicates the number of test recordings already performed with respect to the CD-R, and therefore, the CD-R drive starts the seeking while the position of the area to be subjected to the test recording next to the number of test recordings corresponding to the number of frames detected in the count area 112b is regarded as the target position. Also during this seeking, the irradiation position is moved to the position on the inner peripheral side slightly shifted from the target position similarly as described above. For example, when it is detected that the EFM signal is written in the 30-th frame after the 30-th test recording is performed in the count area 112b, the CD-R drive then moves the irradiation position to the position on the inner peripheral side slightly deviated from the position of the area in which the 31-st test recording is to be performed in the test area 112a.

The CD-R drive performs the seeking toward the outer peripheral side from the slightly inner peripheral position, thereby detects the area to be subjected to the current test recording, and then performs the test recording with respect to the area. In the test recording performed here, the recording laser power value is changed in 15 stages, the EFM signal for one sub code frame is recorded per one recording laser power value, and the EFM signals for 15 frames in total are recorded. After ending the test recording in this manner, obtaining the reproduced signal from the test-recorded area and determining the optimum recording laser power value, the CD-R drive moves the optical pickup, writes an EFM signal in the next frame on the inner peripheral side of the frame with the EFM signal detected therefrom in the count area 112b, and ends the OPC. For example, when the 31-st test recording is performed, the EFM signal is written in a 31-st frame counted from the outer peripheral side of the count area 112*b*.

Additionally, when the EFM signal is not written in the frame B1 of the above-described count area 112*b*, that is, the EFM signal is not written in any frame of the count area 112*b*, the test recording has never been performed in the CD-R, and therefore the test recording is performed with respect to the first area A1 to be subjected to the first test recording in the test area 112*a*.

The above is a detail of the OPC performed by the CD-R drive with respect to each area involved in the PCA 112 of the CD-R conforming to Orange Book (first standard) current at the time of filing of present application.

A-2. CD-R According to the First Embodiment

Figure 3:
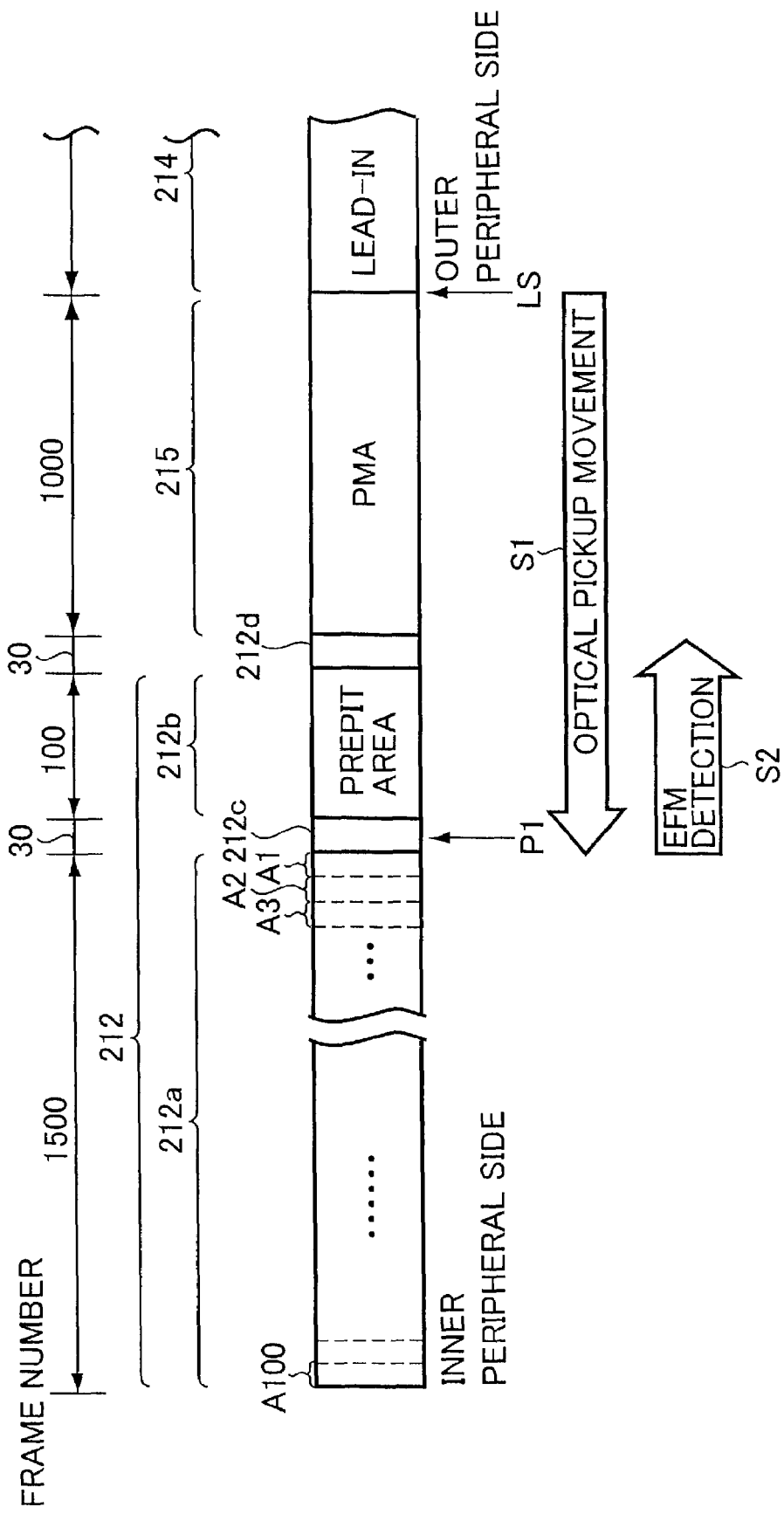
FIG. 3 is a diagram schematically showing an area constitution of a PCA in a CD-R according to a first embodiment of the present invention, which conforms to a standard different from the first standard.

The CD-R according to the present embodiment will next be described. The CD-R according to the present embodiment is a CD-R manufactured in accordance with a standard different from the above-described standard (hereinafter referred to as a second standard for the sake of convenience). When the new CD-R conforming to the second standard is used, and the new CD-R is set in the conventional CD-R drive for executing an appropriate OPC processing with respect to the old CD-R with the above-described areas set therein and a recording processing is performed according to the first standard, the recording seems successful to a user. However in actual, an appropriate recording is not performed, and a problem that the recorded CD-R cannot be reproduced sometimes occurs. The invention is directed to resolve the problem. Namely, when the inventive CD-R according to the present embodiment is set in the conventional CD-R drive designed for performing the recording processing including the OPC with respect to the old CD-R conforming to the first standard, the inventive new CD-R according to the present embodiment uses an area constitution for preventing the conventional CD-R drive from recording the data. The constitution of the new CD-R according to the present embodiment in which the recording processing is prohibited from being performed by the old CD-R drive having a different standard will be described hereinafter with reference to FIG. 3. Additionally, since the program area and the outer peripheral area have an area constitution similar to that of the old CD-R conforming to the first standard, the description thereof is omitted.

As shown in the drawing, in a new CD-R 100 according to the present embodiment, a PCA 212 is prepared on the inner peripheral side, a PMA 215, lead-in area 214, program area (not shown) and residual area are prepared on the outer peripheral side, and the number of frames of the area on the outer peripheral side of the PCA 212 and the start position of each area are similar to those of the old CD-R (see FIGS. 1 and 2) conforming to the above-described first standard. That is, an area of 1660 frames extending from the position on the inner peripheral side spaced from the start position of the lead-in area 214 by 2660 frames is the PCA 212, and an area of 1000 frames extending from the position on the inner peripheral side from the start position of the lead-in area 214 by 1000 frames is the PMA 215.

In the second standard, the PMA 215 is used as the working area for the recording process similarly as the above-described old CD-R conforming to the first standard. Similarly as the first standard, the lead-in area 214 is an area where a table of contents (TOC) is written after the end of the recording of the program area. Moreover, as the ATIP information of this area, the time of the program area, time of lead-in area, start time of the lead-in area, start possible time of a maximum lead-out (LLO: Last Possible Start Time of Lead-Out), special information and the like are recorded. In the new CD-R conforming to the second standard, as special information of the ATIP information, standard identification information indicating that the CD-R is manufactured in accordance with the second standard is prerecorded.

In the new CD-R according to the present embodiment, as the PCA 212, a test area 212*a*, spare areas 212*c*, 212*d*, and prepit area 212*b* are prepared. Similarly as the old CD-R conforming to the above-described first standard (see FIG. 2), as the test area 212*a*, an area or 1500 frames extending from the position on the inner peripheral side spaced from the start position of the lead-in area 214 by 2660 frames is prepared. Similarly as the first standard, the areas of 15 frames for each test recording, that is, areas A1, A2, ... A100 for performing up to 100 times of test recording are prepared.

The prepit area 212*b* is composed of 100 frames extending from the position on the inner peripheral side spaced from the start position of the lead-in area 214 by 1130 frames, and a prepit is formed by mastering in this area to prerecord dummy information. That is, in the old CD-R drive where the new CD-R is set, the prepit area of 100 frames is treated as if the EFM signal has been already written. Here, the prepit area 212*b* is disposed in the same relative position viewed from the start position of the lead-in area as a reference of the position control of the optical pickup as that of the count area 112*b* in the first standard. The area constitution of the CD-R according to the present embodiment has been described above.

A-3. OPC Processing with Respect to CD-R According to the First Embodiment

The OPC processing while setting the new CD-R according to the present embodiment, that is, the CD-R according to the second standard in the conventional CD-R drive conforming to the first standard will next be described. As described above, the CD-R drive conforming to the first standard naturally performs the processing similar to the OPC performed with respect to the old CD-R (see FIGS. 1 and 2) conforming to the above-described first standard. That is, to perform the OPC with respect to the CD-R conforming to the first standard as described above, the number of the test recording sessions performed past with respect to the CD-R is recognized in accordance with a frame range of the count area 112*b* in which the EFM signal is recorded. Therefore, the CD-R drive moves the optical pickup toward the inner peripheral side from the start position LS of the lead-in area 214 (step S1), and starts the seeking of tracks toward the outer peripheral side from the position on the slightly inner peripheral side of the count area 112*b* (the position on the inner peripheral side spaced from the start position of the count area 112*b* by about 20 frames). Even when the new CD-R of the present embodiment is set in this manner, the old CD-R drive performs the seek processing similarly as described above, and the seeking starts from a position P1 on the inner peripheral side slightly spaced from the prepit area 212*b*.

Subsequently, the CD-R drive starts the seeking from the position P1, moves the optical pickup toward the outer peripheral side and detects the frames of the prepit area 212*b* in which the EFM signals are recorded (step S2). Here, the prepit area 212*b* of the CD-R conforming to the second standard is recognized as if the count area in which the EFM signals are recorded by the old CD-R drive. Therefore, the conventional CD-R drive recognizes that the EFM signal is recorded up to the innermost peripheral frame of the prepit area 212b (the frame in the position corresponding to the 100-th count area in the first standard) due to the dummy information provided by the prepits. Thereby, the conventional CD-R drive judges that the 100 times of the test recording of the CD-R end, and executes an error processing of informing the user that the recording cannot be performed any more. That is, the CD-R drive ends the processing without performing the actual recording with respect to the new CD-R according to the present embodiment.

With the use of the above-described CD-R according to the present embodiment, even when the new CD-R is set in the old CD-R drive designed in accordance with the first standard as the different standard, the recording processing can be inhibited from being executed by the old CD-R drive. When the standard differs as described above, various elements such as recording strategy also sometimes change. In this case, even when the recording is apparently performed on the CD-R drive side, the normal recording is not possibly performed in actual in some case. Therefore, when the CD-R according to the present embodiment is used, the recording processing by the CD-R drive designed in accordance with the different standard can be inhibited from being executed, and the recording error can be prevented beforehand from being generated because of the above-described difference of the standard.

Figure 4:
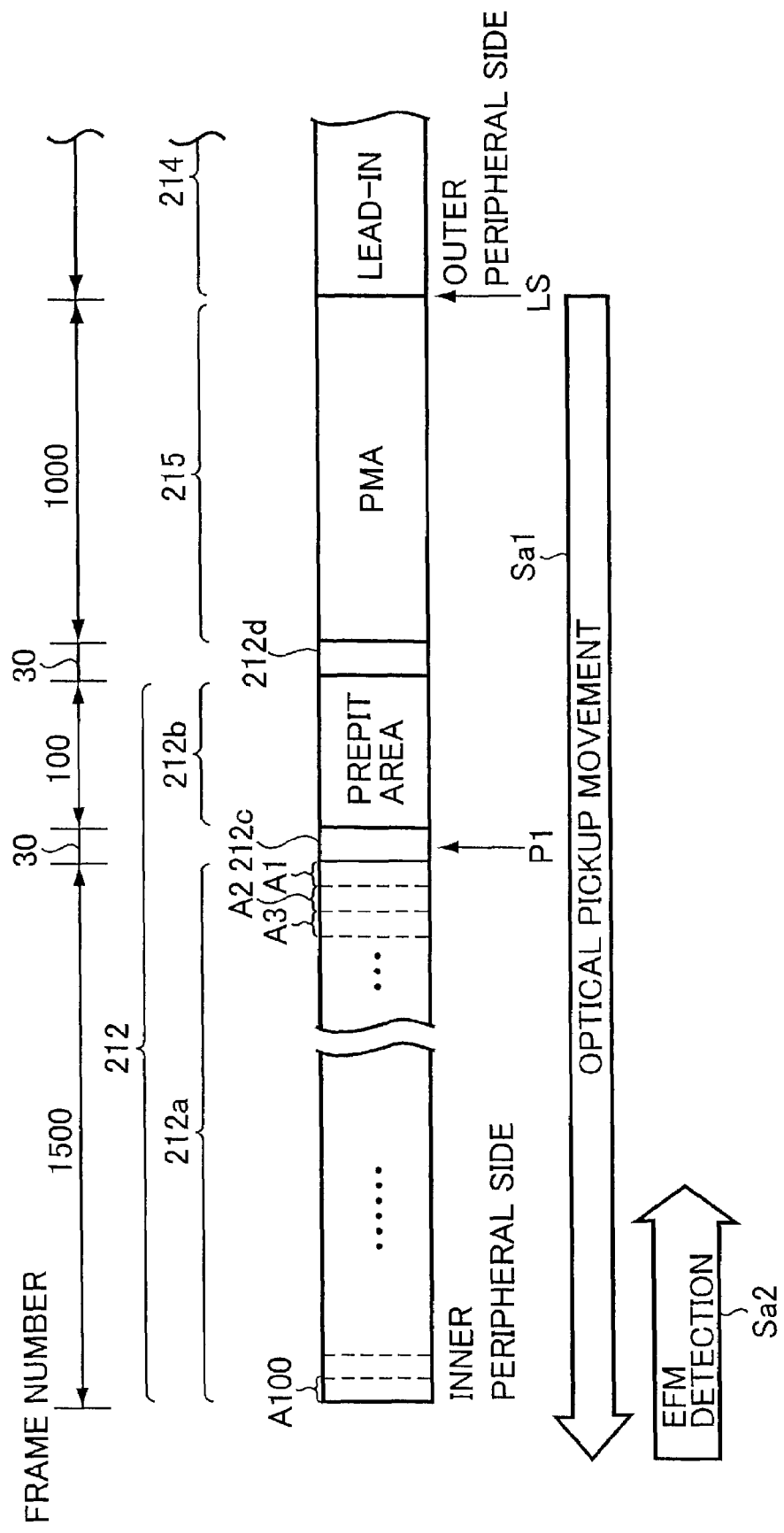
FIG. 4 is an explanatory view showing a processing to be executed by a CD-R drive for performing an appropriate recording with respect to the CD-R according to the first embodiment.

When the new CD-R according to the present embodiment is used as described above, the recording processing can be inhibited from being executed by the old CD-R drive designed in accordance with the first standard. However, when the new CD-R is loaded into the new drive, the test recording needs to be performed in the test area 212a so that the CD-R is subjected to the OPC. Thus, in the new CD-R drive designed for performing the recording with respect to the CD-R conforming to the second standard according to the present embodiment, the OPC may be executed in a procedure shown in FIG. 4.

First, similarly as described above, the start position LS of the lead-in area 214 is specified. Moreover, the optical pickup is moved to a position P2 on the inner peripheral side slightly (by about 20 frames) shifted from the test area 212a from the start position LS of the lead-in area 214 (step Sa1).

Moreover, the CD-R drive starts the seeking toward the outer peripheral side from the position P2, directly accesses and reads the test area 212a, and detects the number of sections in which the test recording is performed in the test area 212a (step Sa2). Here, the area of 1500 frames is prepared in the test area 212a. When the seeking is performed at a basic speed (one second for the seeking of 75 frames), 20 seconds are necessary for reading all the test area 212a of 1500 frames. However, in recent years, the increasing of the seeking speed of the CD-R drive has been realized. For example, when the seeking is performed at ten times as the basic speed, all the test area 212a can be read in two seconds. That is, even when the test area 212a is directly read without using the count area 112b and the number of test recordings already performed is detected, much time is not required. Therefore, when the OPC is executed with respect to the CD-R according to a second standard, the CD-R drive uses a method of directly reading the test area 212a and detecting the number of tests already performed.

The presence/absence of the recording into the test area 212a is read and the number of tests is detected as described above, and the test recording is then performed in the section (15 frames) to be subjected the test recording next to the detected recording except for a case in which 100 test recordings are detected to have been performed. For example, similarly as the first standard, the test recording performed here uses a method of changing the recording laser power value in 15 stages, and recording the EFM signals for one sub code frame per each recording laser power value. The CD-R drive sets an optimum recording laser power value based on the result of the test recording, and performs the real information recording based on the setting. Here, in the CD-R drive, other elements concerning the recording such as the recording strategy are also designed in accordance with the second standard, so that an appropriate recording is performed in the CD-R of the present embodiment.

When the CD-R according to the present embodiment is used in this manner, and set in the CD-R drive designed in accordance with the different first standard, the CD-R drive is inhibited from executing the recording processing and the inappropriate recording is prevented beforehand from being performed. On the other hand, when the CD-R is set in the CD-R drive designed in accordance with the second standard, the OPC is normally executed and the appropriate recording processing can be executed.

Figure 5:
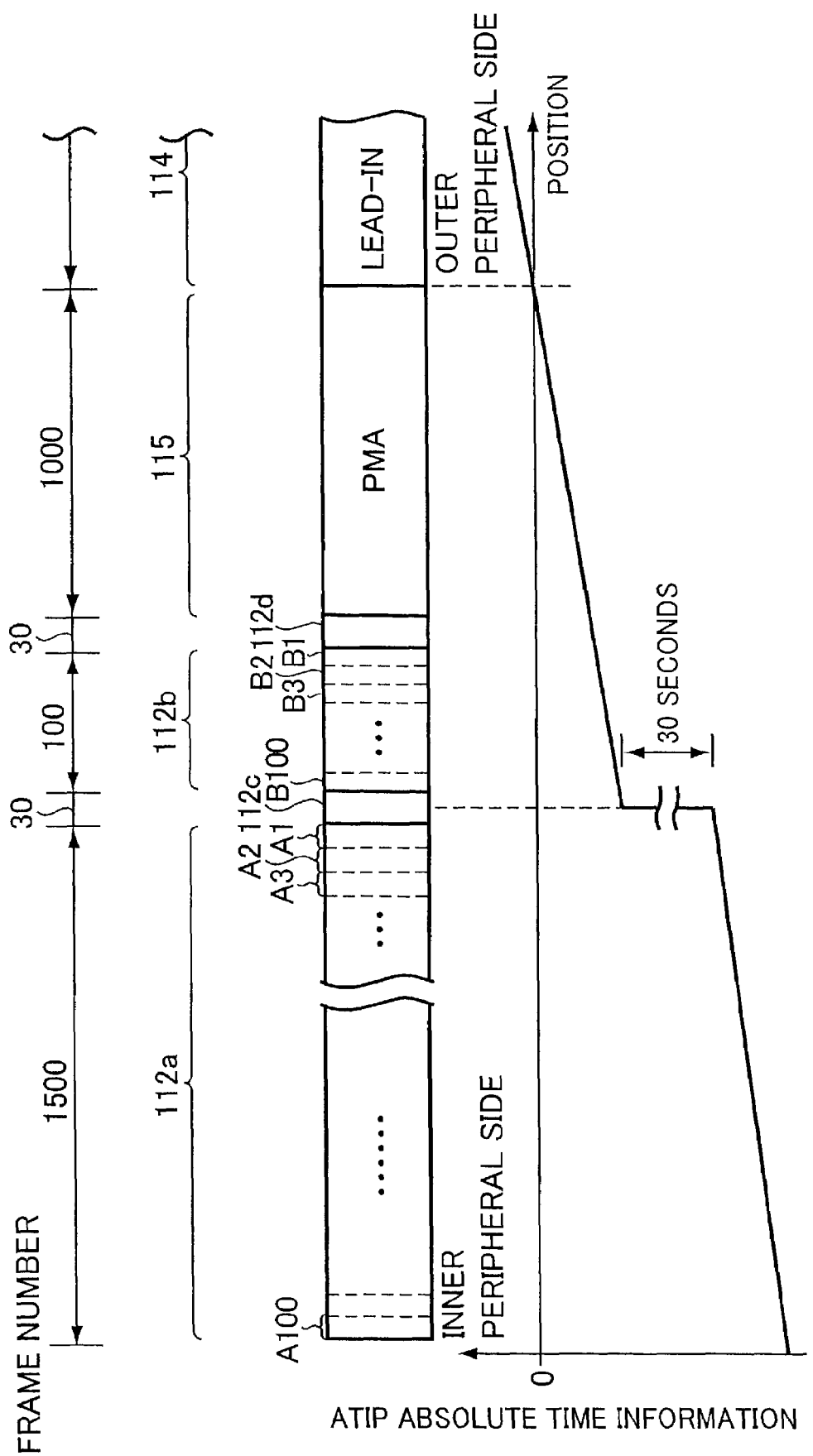
FIG. 5 is an explanatory view of a method of performing the appropriate recording in a case where the CD-R of the different standard is set in the CD-R drive.

When the CD-R according to the present embodiment is used as described above, the inappropriate recording because of the difference of the standard can be prevented beforehand, and the following method using the ATIP information is also considered as a method of preventing the inappropriate recording because of the difference of the standard beforehand. That is, as shown in FIG. 5, a method is considered using the CD-R in which the absolute time information indicated in the ATIP information in the vicinity of the PCA 112 is discontinuous in the spare area 112c. For the ATIP information, an absolute time of the start position LS of the lead-in area 114 has a reference "0:00", +absolute time information is indicated on the outer peripheral side from the start position of the lead-in area 114, and −absolute time information is indicated on the inner peripheral side. Additionally, in FIG. 5, the ordinate indicates the absolute time information of the ATIP, and the abscissa indicates the position of each area.

The absolute time information indicated in the ATIP information in a middle position (the start position of the 16-th frame from the innermost peripheral side) of the above-described spare area 112c is constituted to have a discontinuity of 30 seconds (the position for 2250 frames). Therefore, the absolute time information included in the ATIP information of the start position at the 16-th frame from the innermost peripheral side of the spare area 112c indicates a value larger than a value of the absolute time information indicated in the ATIP information of the start position of the 15-th frame from the innermost peripheral side of the spare area 112c on the inner peripheral side from the discontinuous portion by about 30 seconds or more.

In the CD-R drive having such CD-R set therein and designed in accordance with the first standard, when the OPC is executed, first the optical pickup is moved and the seeking is started toward the outer peripheral side from the position on the inner peripheral side of the spare area 112c. That is, the position on the inner peripheral side slightly from the discontinuous portion of the absolute time information of the ATIP information is a seeking start position. Moreover, when the CD-R drive starts the seeking toward the outer peripheral side from the position, and the seeking position moves toward the outer peripheral side beyond the discontinuous portion of the absolute time information of the ATIP information, the absolute time information increases by 30 seconds or more. Therefore, although the CD-R drive seeks the position in the spare area 112c, it is recognized that the seeking position moves further toward the outer peripheral side through the count area 112b. As a result, the CD-R drive moves the optical pickup toward the inner peripheral side and starts the seeking from the position on the inner peripheral side of the spare area 112c again. Thereafter, after performing the operation of allowing the seeking position of the optical pickup to reciprocate between the positions on the inner and outer peripheral sides from the discontinuous portion several times every passing through the discontinuous portion, the error processing of informing the user that the prepit area 212b cannot be detected is performed to stop the recording processing.

Therefore, when the CD-R having the discontinuous portion of the absolute time information of the ATIP information in the spare area 112c is used, similarly as the above-described embodiment, the recording processing is inhibited from being executed by the CD-R drive designed with the different standard, and the inappropriate recording can be prevented beforehand. However, this method has the following problem.

The CD-R drive moves the optical pickup so as to set the seeking start position to the slightly inner peripheral position as described above, when the seeking position is moved to the certain target position (e.g., the innermost peripheral position of the count area 112b). This is because the runup section is set for synchronization with the ATIP information in order to more correctly detect the target position. A length of this runup section is inherent in the CD-R drive manufactured by each company, and both the CD-R having the runup section set to be long and the CD-R having the section set to be short are in fact distributed. Here, when the CD-R having the discontinuous portion of the absolute time information in the spare area 112c as described above is set in the CD-R drive having the runup section set to be long (e.g., having a runup period set for 200 frames), not only the count area 112b but also the PMA 115 cannot disadvantageously be sought. More concretely, the position on the inner peripheral side from the innermost peripheral (start) position by 200 frames of the runup section is the position on the inner peripheral side from the above-described discontinuous portion. That is, the CD-R drive which is to seek the start position of the PMA 115 repeats the operation of allowing the seeking position to reciprocate between the positions on the inner and outer peripheral sides via the discontinuous portion similarly as the operation of seeking the above-described count area 112b as the target. As a result, the error processing is executed. Therefore, when the CD-R having the discontinuous portion of the absolute time information of the ATIP information in the above-described spare area 112c is set in the CD-R drive having the runup section set to be long, the disadvantage occurs.

On the other hand, the CD-R including the prepit area 212b according to the present embodiment is not influenced by the length of the runup section set in the CD-R drive with the CD-R set therein, and is therefore effective for the CD-R drive manufactured by various makers.

A-4. Modification Examples of First Embodiment

A-4-1. Modification Example 1

Figure 6:
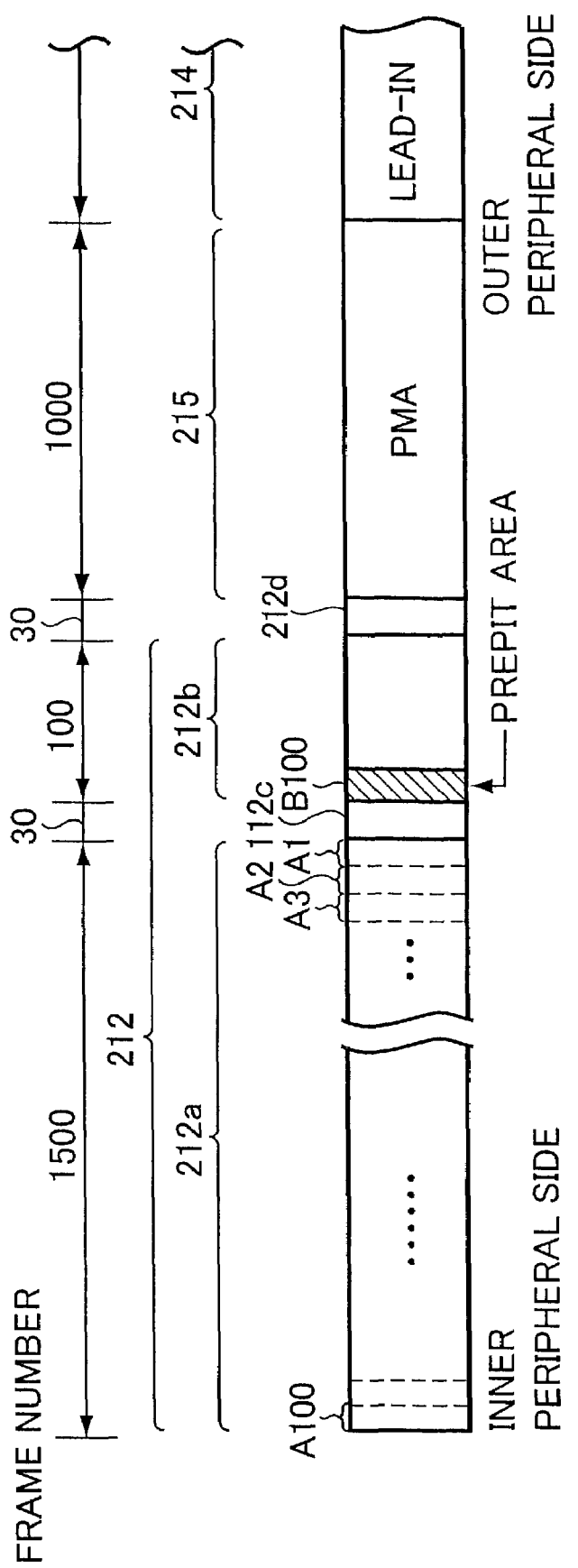
FIG. 6 is a diagram schematically showing the area constitution of the PCA in a modification example of the CD-R according to the first embodiment.

Additionally, in the above-described first embodiment, the prepits are formed in all the areas of the prepit area 212b, but, as shown in FIG. 6, the prepit may be formed only in the innermost peripheral frame B100 (shown by slant lines in the drawing) as the 100-th frame in the prepit area 212b. Even when the prepit is formed only in the frame B100, similarly as the embodiment, the CD-R drive designed in accordance with the first standard detects that the EFM signal is written in the frame B100 and, as a result, judges that 100 test recordings have already been performed. Therefore, similarly as the above-described embodiment, the recording processing is inhibited from being executed by the CD-R drive designed with the different standard, and the inappropriate recording can be prevented beforehand.

A-4-2. Modification Example 2

Figure 7:
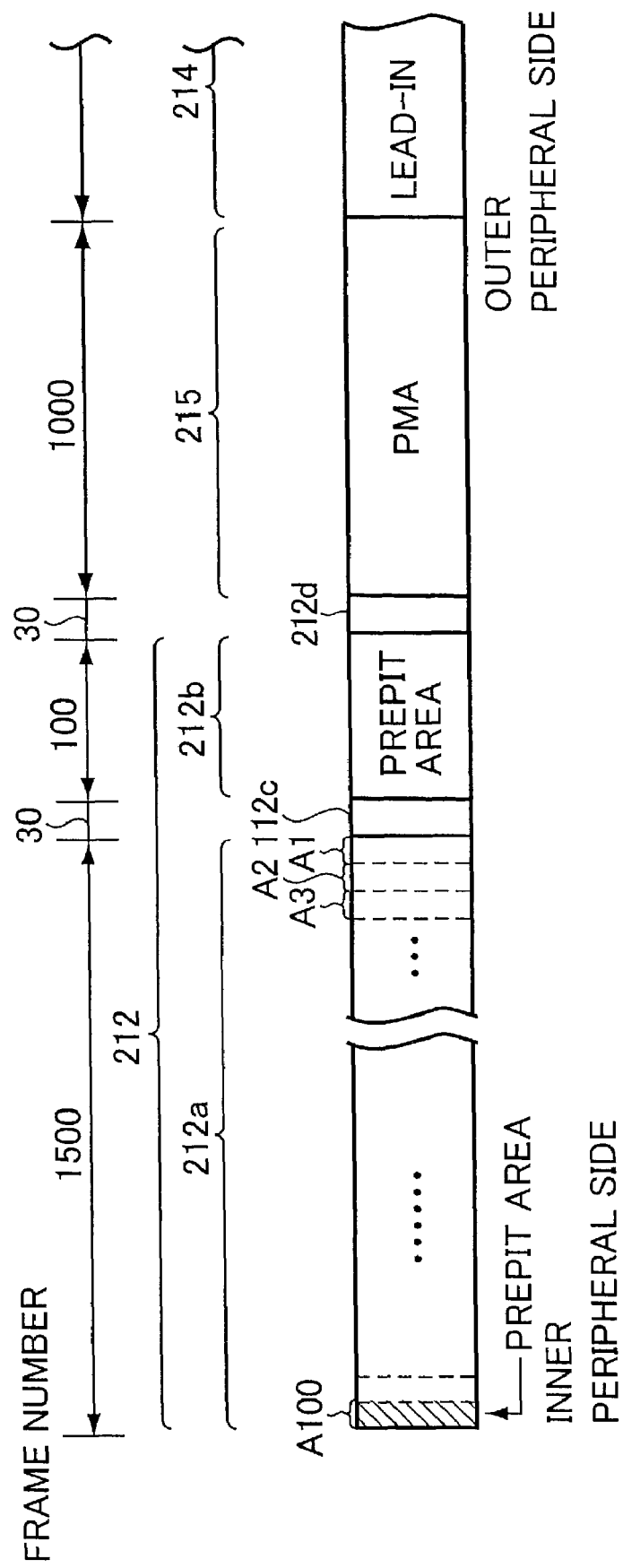
FIG. 7 is a diagram schematically showing the area constitution of the PCA in another modification example of the CD-R according to the first embodiment.

Moreover, in the above-described embodiment, the prepit is formed in the prepit area 212b, but additionally the prepit may be formed in the test area 212a. For example, as shown in FIG. 7, the prepit may be formed only in the area A100 (shown by slant lines in the drawing) of the test area 212a in which 100 test recordings are performed. For example, as the CD-R drive designed in accordance with the first standard, even when the EFM signal is written in the 100-th frame of the count area 112b, an apparatus set to perform a processing of detecting whether or not the test recording has been performed in actual in the test area 112a in a confirming manner is supposedly distributed. Even with respect to the CD-R drive set to execute the control processing, the prepit is formed in the test area 212a, it is judged that the test recording is not performed and the inappropriate recording can be prevented beforehand from being performed. Additionally, when the prepit is formed in the area A100 of the test area 212a, the CD-R drive conforming to the second standard may perform the seeking toward the outer peripheral side from the area for performing the 99-th test recording as a start point in order to detect the number of tests already performed.

A-4-3. Modification Example 3

Moreover, in the above-described embodiment, the CD-R drive conforming to the second standard directly seeks the test area 212a, and detects the number of tests already performed without using the count area. However, a new count area may be disposed in the position other than the position corresponding to the count area 112b in the CD-R, and the CD-R drive may seek the new count area in order to detect the number of tests.

Figure 8:
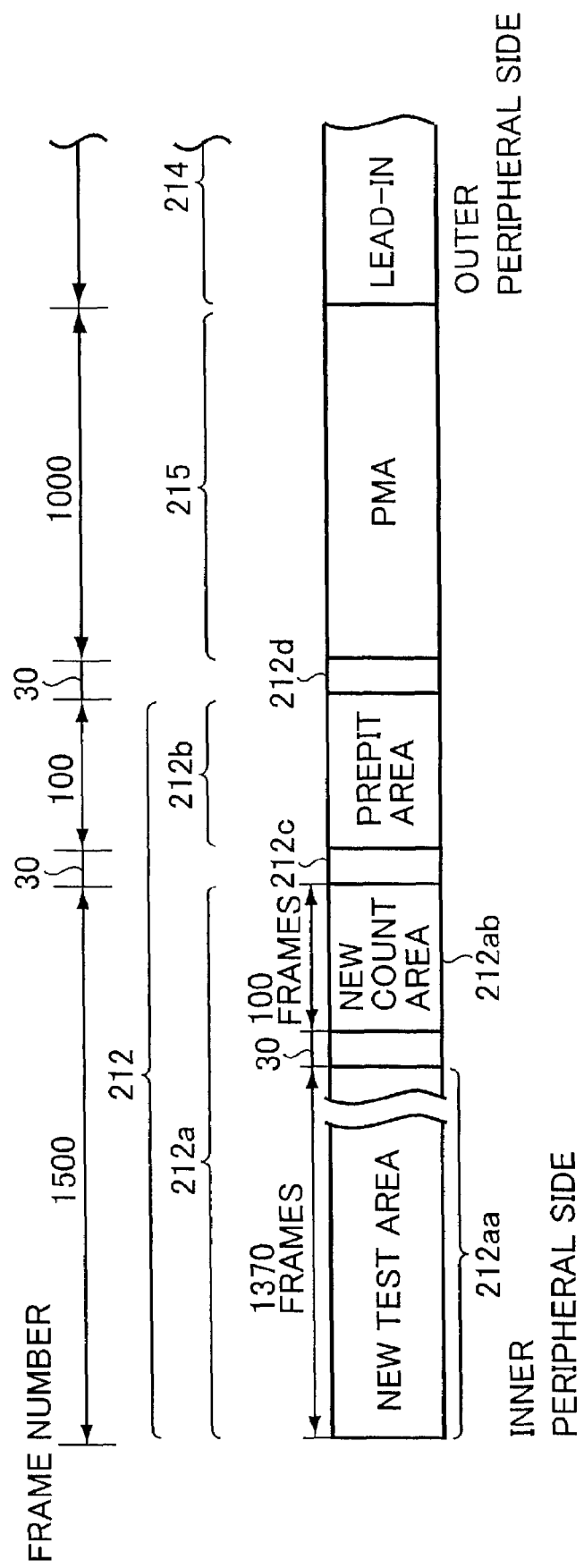
FIG. 8 is a diagram schematically showing the area constitution of the PCA in another modification example of the CD-R according to the first embodiment.

For example, as shown in FIG. 8, 1370 frames (91 test recordings each for 15 frames+5 frames) on the inner peripheral side of the test area 212a prepared for 1500 frames in the above-described embodiment are set as a new test area 212aa, and 100 frames from the outer peripheral side from the test area 212a may be set as a new count area 212ab.

Moreover, in addition to the dividing of the test area 212a of the position corresponding to the test area 112a in the first standard into the new test area 212aa and new count area 212ab and the setting of the new count area as described above, a new count area may also be set on the further inner peripheral side of the test area 212a. The new count area may also be set to the position on the outer peripheral side from a start possible time of a maximum lead out (LLO: Last Possible Start Time of Lead Out) indicated in the ATIP information by a maximum time (one minute and 30 seconds) which can be taken by the lead out. When the new count area is set in the CD-R, the CD-R drive conforming to the standard needs to be set to execute a processing of detecting the number of tests using the count area newly set by the CD-R drive conforming to the standard.

Moreover, also when the prepit is formed in the area A100 of the test area 212a as in Modification Example 2, the area other than the test area 212a may be divided into the test and count areas and used.

A-4-4. Modification Example 4

Moreover, in the above-described embodiments and modification examples, the CD-R to which the present invention is applied has been described, but the present invention can broadly be applied to the optical disks such as a CD-RW conforming to the standard in which the count area for detecting the number of tests already performed is set.

Additionally, when the present invention is applied to the CD-RW and the prepit is formed only in the prepit area 212b as described in the above-described embodiments and modification examples, the disadvantage sometimes occurs depending on an OPC processing content set to be performed by the CD-RW drive. That is, when the EFM signals are written in all the count area 112b, the CD-RW drive conforming to the first standard and general in the filing time of the present application erases (DC ERASE) the EFM signals recorded in the count area 112b and test area 112a, uses the test area 112a and count area 112b with the EFM signals erased therefrom again and executes the OPC.

Therefore, when the prepit is formed in the prepit area 212b as described above, the CD-RW drive executes an erasing processing with respect to the prepit area 212b, and subsequently executes the recording processing with respect to the area A1 of the test area 212a to be subjected to the first test recording (the erasing is impossible because of the prepit). Here, after the executing the erasing processing with respect to the prepit area 212b, the CD-RW drive is set to execute the error processing of detecting whether or not the erasing is successful and informing the user of failure when the erasing is not successful. In this case, the recording processing can be inhibited from being continued by the CD-RW drive. However, a certain apparatus type is set to execute the recording processing with respect to the area A1 to be subjected to the first test recording in the test area 212a as such without detecting whether or not the erasing processing is successful with respect to the prepit area 212b, and this type of apparatus is presented to the user in actual. When the CD-RW with the prepit formed in the prepit area 212b is set in the CD-RW drive set as described above, the error cannot be generated during the OPC processing, and the inappropriate recording processing not meeting the second standard is executed as such.

Figure 9:
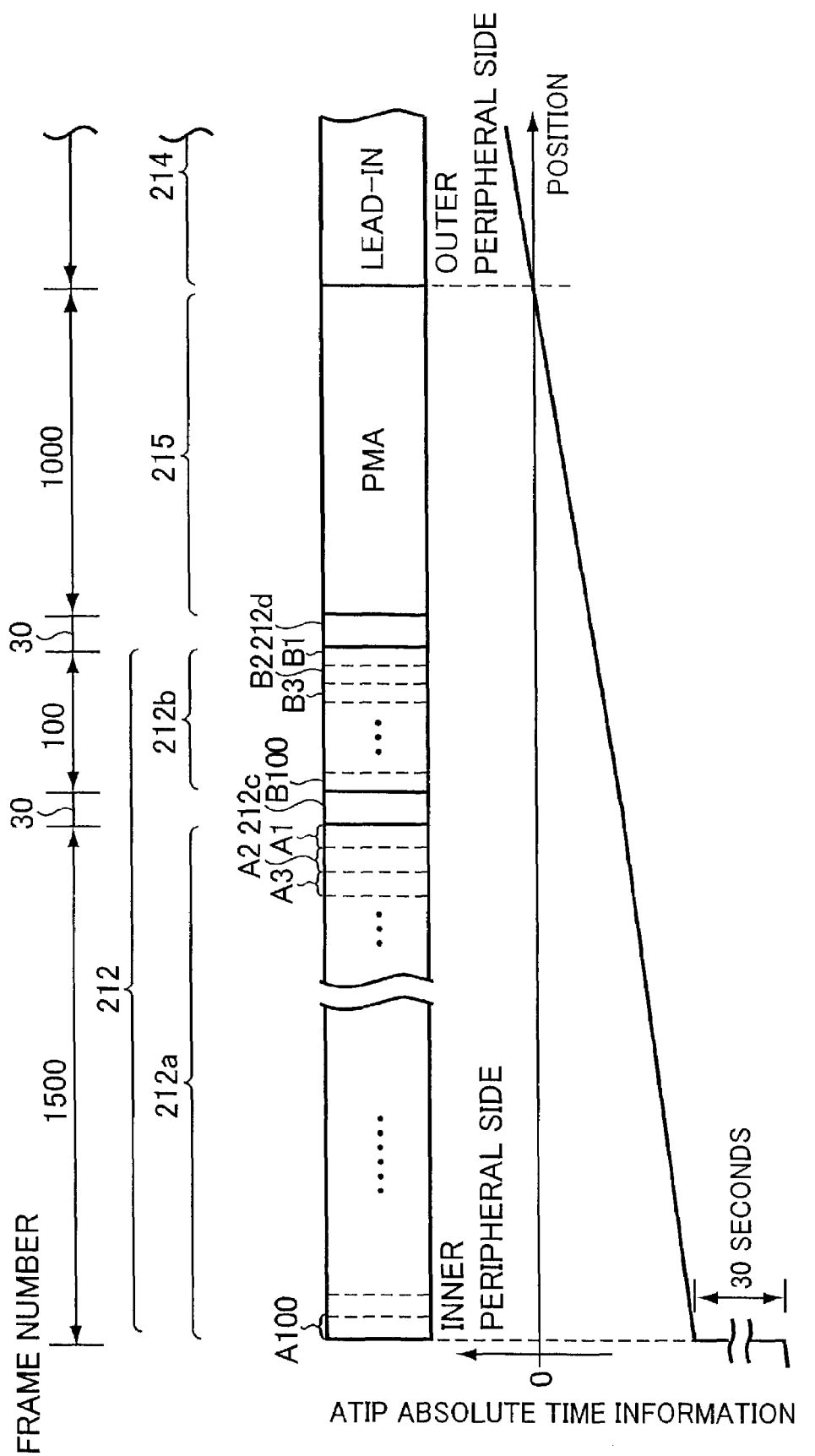
FIG. 9 is a diagram schematically showing the area constitution of the PCA of a CD-RW in a case where the present invention is applied to the CD-RW.

To solve the problem, when the present invention is applied to the CD-RW, as shown in FIG. 9, the prepit is formed in the prepit area 212b similarly as the above-described embodiments and modification examples, and the discontinuous portion of the absolute time information of the ATIP information may be disposed in the innermost peripheral position of the test area 212a or the inner peripheral position slightly from the test area 212a. Additionally, in FIG. 9, the ordinate indicates the absolute time information of the ATIP, and the abscissa indicates the position of each area.

In the shown example, the absolute time information indicated by the ATIP information in the innermost peripheral position of the test area 212a has a discontinuous portion with a difference of 30 seconds (the position for 2250 frames) from the previous absolute time information. Therefore, the absolute time information included in the ATIP information in the innermost peripheral position of the test area 212a indicates a value larger than the value of the absolute time information indicated in the ATIP information in the inner peripheral position from the discontinuous portion by about 30 seconds or more. Additionally, the discontinuous portion may be disposed in the position on the inner peripheral side slightly from the innermost peripheral position of the test area 212a. The discontinuous portion may be disposed in the inner peripheral position further from the innermost peripheral position of the test area 212a in a range shorter than the runup section of the CD-RW drive in order to seek the innermost peripheral position of the test area 212a.

In the OPC processing executed by the CD-RW drive designed in accordance with the first standard and having the CD-RW set therein, since the prepit area 212b of the set CD-RW is the prepit, the erasing processing is executed with respect to the prepit area 212b, and subsequently the erasing processing is executed with respect to the test area 212a. In the erasing processing of the test area 212a executed by the CD-RW drive, the CD-RW drive first moves the optical pickup to the inner peripheral position from the test area 212a, and moves the pickup toward the outer peripheral side from the position while successively executing the erasing processing. Here, for the CD-RW shown in FIG. 9, the discontinuous portion of the absolute time information of the ATIP information is disposed in the innermost peripheral position of the test area 212a. That is, the CD-RW drive moves the seeking position toward the inner peripheral side from the discontinuous portion of the absolute time information of the ATIP information. Therefore, when the CD-RW drive starts the seeking toward the outer peripheral side from the position, and the seeking position moves toward the outer peripheral side beyond the discontinuous portion of the absolute time information of the ATIP information, the absolute time information increases by 30 seconds or more. Therefore, the CD-RW drive seeks the innermost peripheral position of the test area 212a, but recognizes that the seeking position has moved further toward the outer peripheral side through the test area 212a. As a result, the CD-RW drive moves the optical pickup toward the inner peripheral side and starts the seeking from the inner peripheral position slightly from the innermost peripheral position of the test area 212a again. Thereafter, after performing the operation of allowing the seeking position of the optical pickup to reciprocate between the positions on the inner and outer peripheral sides from the discontinuous portion several times every passing through the discontinuous portion, the error processing of informing the user that the erasing processing cannot be executed with respect to the test area 212a is executed to stop the processing.

Therefore, in addition to the forming of the prepit in the prepit area 212b, with the use of the CD-RW in which the discontinuous portion of the absolute time information of the ATIP information is disposed in the innermost peripheral position of the test area 212a or on the inner peripheral side slightly from the position, the recording processing is inhibited from being executed by the CD-RW drive designed to execute the erasing processing with respect to the test area 212a and prepit area 212b, and the inappropriate recording can be prevented beforehand.

B. Second Embodiment

B-1. Constitution

Figure 10:
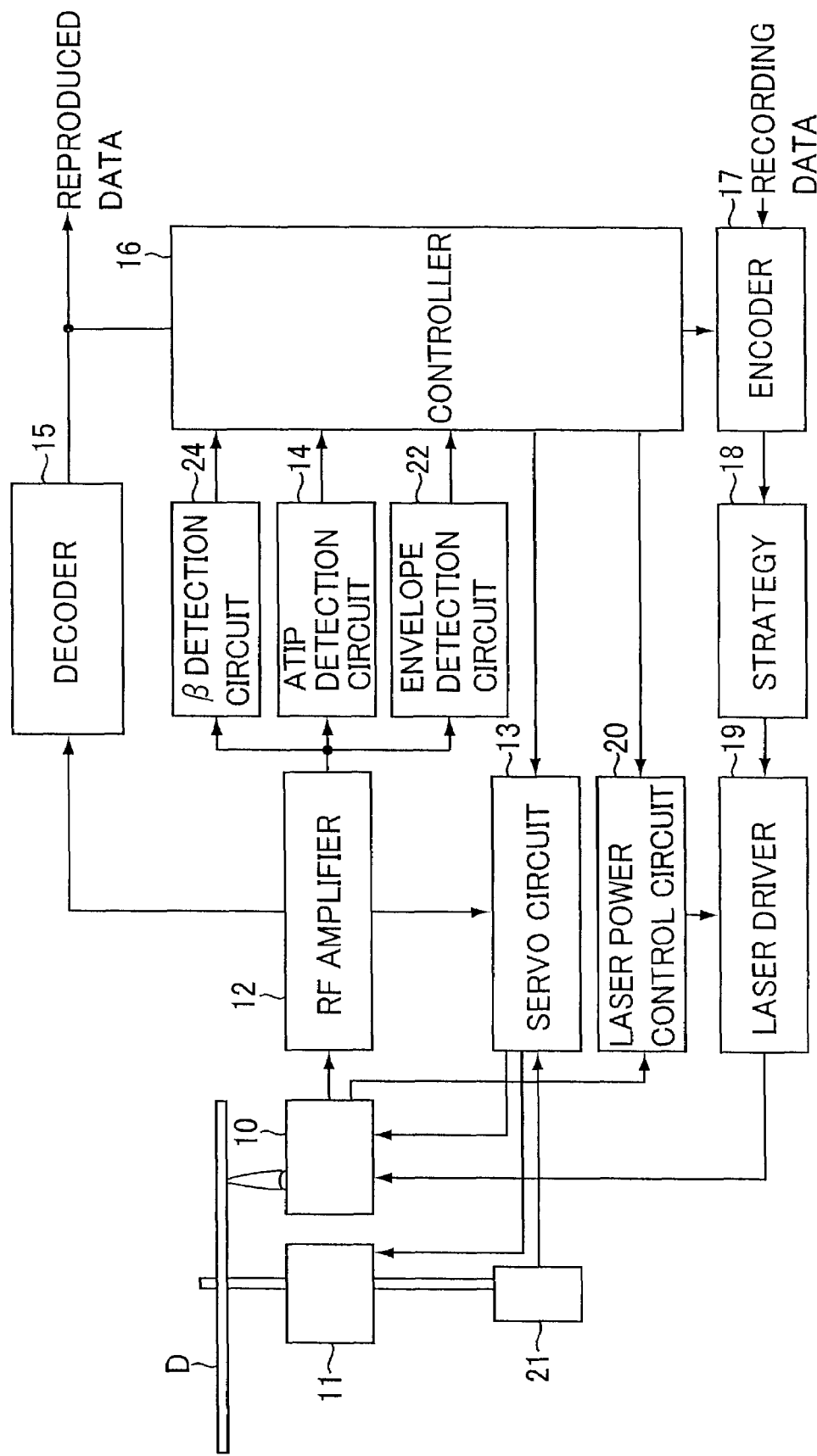
FIG. 10 is a block diagram showing a constitution of an optical disk recording apparatus according to a second embodiment of the present invention.

An optical disk recording apparatus according to a second embodiment of the present invention will next be described. The optical disk recording apparatus according to the second embodiment is an apparatus which performs an appropriate recording processing with respect to the respective optical disks manufactured in accordance with the different standards such as the CD-R conforming to the above-described first standard (see FIGS. 1 and 2), and the above-described CD-R or CD-RW conforming to the second standard (see FIGS. 3, 6, 7, 9). The constitution of the optical disk recording apparatus according to the second embodiment will be described hereinafter with reference to FIG. 10, which can execute an appropriate recording processing with respect to the respective optical disks manufactured in accordance with the different standards.

As shown in the drawing, the optical disk recording apparatus includes an optical pickup 10, spindle motor 11, radio frequency (RF) amplifier 12, servo circuit 13, ATIP detection circuit 14, decoder 15, controller 16, encoder 17, strategy circuit 18, laser driver 19, laser power control circuit 20, frequency generator 21, envelope detection circuit 22, and β detection circuit 24.

The spindle motor 11 is a motor for rotating/driving an optical disk D as an object in which data is recorded. The optical pickup 10 has a laser diode, optical system such as a lens and mirror, and a return light receiving element, irradiates the optical disk D with a laser beam during recording and reproducing, receives return light from the optical disk D and outputs an EFM-modulated RF signal as a light receiving signal to the RF amplifier 12. Moreover, the optical pickup 10 has a monitor diode, a current is generated in the monitor diode by the return light from the optical disk D, and the current is supplied to the laser power control circuit 20.

The RF amplifier 12 amplifies the EFM-modulated RF signal supplied from the optical pickup 10, and outputs the amplified RF signal to the servo circuit 13, ATIP detection circuit 14, envelope detection circuit 22, β detection circuit 24 and decoder 15. The decoder 15 EFM-demodulates the EFM-modulated RF signal supplied from the RF amplifier 12 and generates reproducing data during the reproducing.

To perform the recording as described above, the optical disk recording apparatus according to the present embodiment executes the OPC processing prior to the real recording. The OPC processing comprises: performing the test recording in the PCA (see the first embodiment) on the inner peripheral side of the optical disk D; and obtaining a laser power value such that a satisfactory recording is performed with respect to the optical disk D based on the reproduced result of the area subjected to the test recording. One test recording in the optical disk recording apparatus comprises: changing the recording laser power value in 15 stages; recording the EFM signal for one sub code frame per recording laser power value; and recording the EFM signals for 15 frames in total. In the optical disk recording apparatus according to the present embodiment, the above-described test area 112a and test area 212a are subjected to the test recording before performing the real recording.

The ATIP detection circuit 14 extracts wobble signal components from the EFM signal supplied from the RF amplifier 12, decodes the ATIP information included in the wobble signal components, acquires the absolute time information indicating the position on the optical disk D, identification information for identifying the disk, and information indicating the type of the disk such as a dyestuff of the disk and outputs the information to the controller 16. Here, standard identification information indicating that the disk conforms to the second standard is described in the special information of the ATIP information of CD-R conforming to the above-described second standard, and the ATIP detection circuit 14 also acquires the standard identification information from the CD-R conforming to the second standard and outputs the information to the controller 16.

The β detection circuit 24 calculates a β (asymmetry) value as a parameter concerning a reproduced signal quality level from the EFM-modulated RF signal supplied from the RF amplifier 12 during the reproducing of the above-described test recording area, and outputs a calculated result to the controller 16. Additionally, the β value is obtained by $(a+b)/(a-b)$, in which a peak level (sign is +) of an EFM-modulated signal waveform is a, and a bottom level (sign is −) is b.

The envelope detection circuit 22 detects an envelope of the EFM signal of the count area 112b of the above-described optical disk D in order to detect the portion of the predetermined test area of the optical disk D, from which the test recording is to be started, before the above-described test recording is performed.

The servo circuit 13 executes the rotation control of the spindle motor 11 and the focus control, tracking control, and feed control of the optical pickup 10. As a driving method of the spindle motor 11 during the recording, any one of a method (CAV: Constant Angular Velocity) of driving the optical disk D at a constant angular velocity and a method (CLV: Constant Liner Velocity) of rotating/driving the optical disk D so as to obtain a constant recording linear velocity may be used. For example, when the CLV method is used, the servo circuit 13 executes the CLV control to drive the spindle motor 11 at the set linear velocity in response to the control signal supplied from the controller 16 and indicating the set velocity. Here, the CLV control by the servo circuit 13, the spindle motor 11 is controlled so that the wobble signal of the EFM-modulated signal supplied from the RF amplifier 12 has a linear velocity magnification.

The encoder 17 EFM-modulates supplied recording data, and outputs the data to the strategy circuit 18. The strategy circuit 18 executes a time axis correction processing with respect to the EFM signal supplied from the encoder 17, and outputs the signal to the laser driver 19. The laser driver 19 drives the optical pickup 10 in response to the signal modulated in accordance with the recording data supplied from the 18, and the control of the laser power control circuit 20.

The laser power control circuit 20 controls the laser power emitted from the laser diode of the optical pickup 10. Concretely, the laser power control circuit 20 controls the laser driver 19 based on a current value supplied from the monitor diode of the optical pickup 10, and the information indicating the target value of the optimum laser power obtained by the OPC supplied from the controller 16 so that the laser beam having the optimum laser power is emitted from the optical pickup 10.

The controller 16 is constituted of a central processing unit (CPU) 16A, read only memory (ROM) 16B and random access memory (RAM) 16C, controls apparatus components of the optical disk recording apparatus in accordance with the program stored in the ROM, and performs the recording with respect to the optical disk D.

The controller 16 controls the apparatus the respective apparatus components so that the PCA of the optical disk D set in the optical disk recording apparatus is subjected to the test recording so as to execute the OPC prior to the above-described real recording. In this case, the controller 16 judges whether the set optical disk D is the optical disk conforming to the first standard or the optical disk conforming to the second standard from the ATIP information of the lead-in area of the set optical disk D supplied from the ATIP detection circuit 14. Moreover, the controller 16 controls the respective apparatus components in order to perform the test recording in accordance with the first standard, when the set optical disk D is the optical disk D conforming to the first standard. On the other hand, the controller controls the respective apparatus components in order to perform the test recording in accordance with the second standard, when the set optical disk D is the optical disk D conforming to the second standard. Here, the control for the test recordings conforming to the first and second standards performed during the OPC processing is described in the above-described first embodiment, and therefore the detailed description thereof is omitted.

When the test recording conforming to the set optical disk D is performed, similarly as the general optical disk recording apparatus, the controller 16 executes the OPC processing of determining the optimum laser power from the reproduced result of the test recording, and thereafter controls the respective apparatus components in order to perform the recording with the OPC result reflected therein.

B-2. Operation

Figure 11:
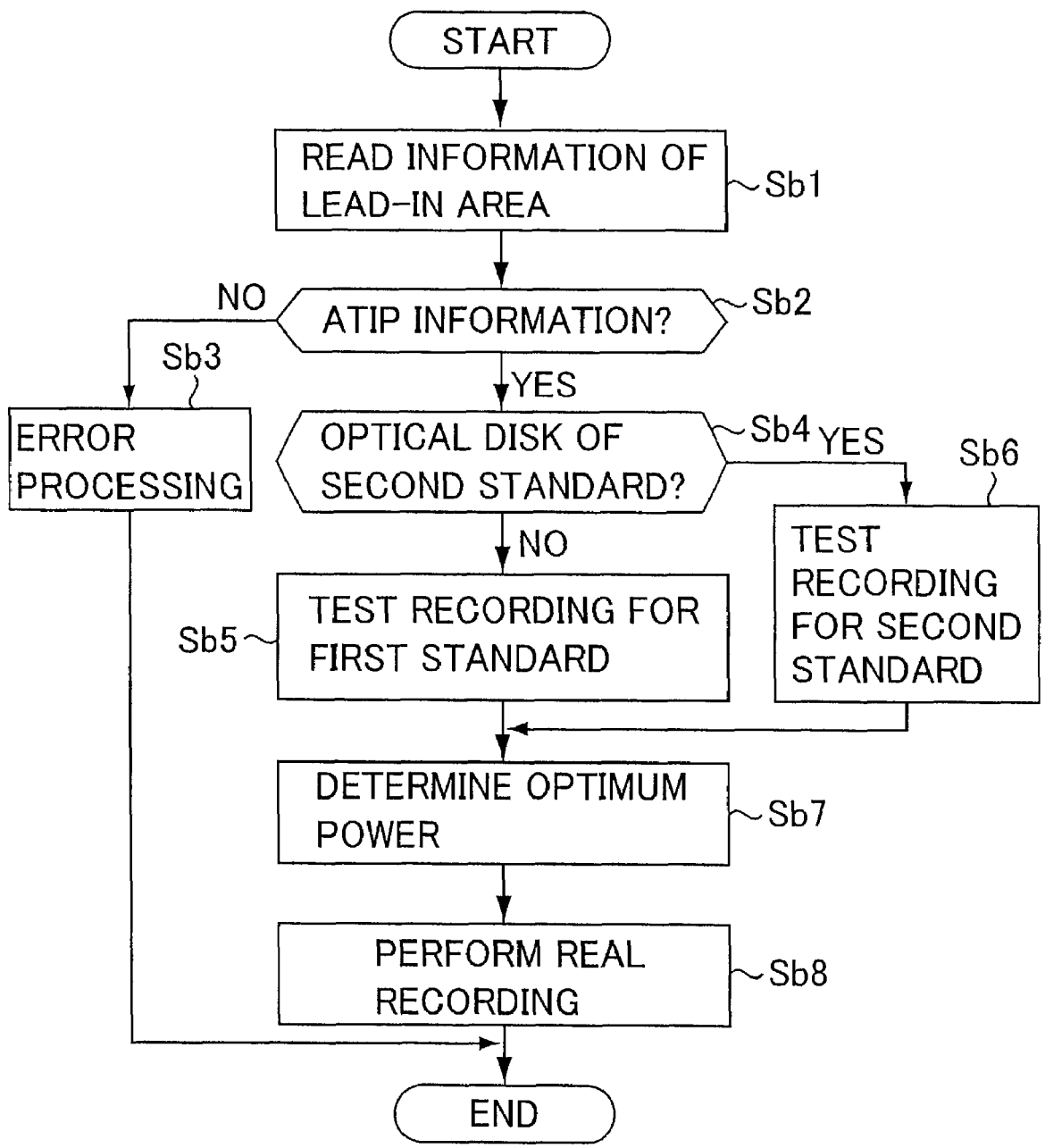
FIG. 11 is a flowchart showing a processing executed by a controller of the optical disk recording apparatus according to the second embodiment during the recording.

The constitution of the optical disk recording apparatus according to the second embodiment of the present invention has been described above. The operation by the optical disk recording apparatus constituted as described above during the recording will be described hereinafter with reference to a flowchart FIG. 11 showing a processing executed in accordance with the program stored in the ROM by the controller 16.

First, when the user sets the optical disk D in the optical disk recording apparatus, and instructs a recording start, the controller 16 reads the information described in the lead-in area of the optical disk D set in order to execute the OPC prior to the real recording (step Sb1). Subsequently, it is judged whether or not the ATIP information is included in the lead-in area of the set optical disk D (step Sb2). Here, when the ATIP information is not included, the controller 16 judges that the optical disk is a read only disk such as CD-ROM, executes the error processing (step Sb3) of informing the user that the recording is impossible and ends the processing.

On the other hand, when the ATIP information is included in the lead-in area of the set optical disk D, the controller 16 judges the optical disk D to be a recordable optical disk such as CD-R and CD-RW. It is then judged whether or not the special information of the ATIP information includes the standard identification information indicating the disk conforming to the second standard (step Sb4). That is, the controller 16 judges whether the set optical disk D conforms to the second standard or the first standard.

Here, when the ATIP information does not include the standard identification information, the controller 16 judges the set optical disk D to conform to the first standard, and controls the respective apparatus components in order to perform the test recording conforming to the first standard in the test area 112a (see FIG. 2) (step Sb5). In the control, the controller 16 controls the optical pickup 10 to seek the count area 112b, and detects the number of test recordings already performed with respect to the optical disk D by judging the range of frames of the count area 112b in which the EFM signals are written. Moreover, the controller 16 controls the optical pickup 10, and performs the test recording with respect to the test recording next to the detected test recordings in the test area 112a.

On the other hand, in the judgment of the step Sb4, when the ATIP information includes the standard identification information, the controller 16 judges the set optical disk D to conform to the second standard, and controls the respective apparatus components in order to perform the test recording conforming to the second standard in the test area 112a (see FIG. 3) (step Sb6). In the control, the controller 16 detects the number of test recordings already performed with respect to the optical disk D in accordance with the second standard. For example, the second standard defines that the new count area is set in the position different from the position of the count area 112b (see FIG. 2). In this case, the optical pickup 10 is controlled so as to seek the newly set count area and the number of tests already performed is detected. Moreover, the second standard defines that the test area 212a is directly sought and the number of tests is detected without setting the count area. In this case, the optical pickup 10 is controlled so as to seek the test area 212a and the number of tests already performed is detected. Subsequently, the controller 16 controls the optical pickup 10, and performs the test recording with respect to the area to be subjected to the test recording next to the detected test recordings in the test area 212a.

When the respective apparatus components are controlled so as to perform the test recording, the controller 16 determines the optimum recording laser power value based on the OPC result acquired from the reproduced signal of the area subjected to the test recording (step SB7). Thereafter, the controller 16 controls the laser power control circuit 20 and servo circuit 13 so that the recording is performed with the optimum laser power value determined by the OPC result, and performs the real recording processing with respect to the optical disk D (step Sb8). During this recording, when a content concerning the recording such as a recording strategy differs with the first and second standards, the recording strategy conforming to the standard of the set optical disk D is used and the recording is performed.

As described above, in the optical disk recording apparatus according to the second embodiment, it is judged whether the set optical disk D conforms to the first standard or the second standard, and the recording processing conforming to the distinguished standard is executed. Therefore, even when the optical disk D having any standard is set, the appropriate recording can be performed.

B-3. Modification Example of the Second Embodiment

Additionally, in the second embodiment, the appropriate recording is performed with respect to the optical disk D manufactured in accordance with two types of standards including the first and second standards, but the appropriate recording may be performed with respect to the respective optical disks D conforming to three or more types of standards. Concretely, the information by which the respective types can be identified on the optical disk recording apparatus side is described beforehand in the ATIP information in the optical disks D having various standards, and the appropriate recording processing for various standards may be executed in accordance with the identified result.

Moreover, the controller 16 to execute the recording processing in accordance with the standard of the set optical disk D as described above may be constituted of an exclusive hardware circuit. Furthermore, various recording mediums such as CD-ROM in which the program for allowing the computer to realize the recording processing is recorded may be supplied to the user, or the program may be supplied to the user via communication circuits such as Internet.

As described above, according to the present invention, when the standard of the optical disk is changed, the recording apparatus conforming to the standard before the change can be inhibited from performing the inappropriate recording.

What is claimed is:

1. A first optical disk having a circular shape formed with a pregroove along a circumferential direction of the circular shape, wherein:

the first optical disk is compatible with one type of a recording apparatus which is designed to irradiate an optical beam onto the optical disk to form pits along the pregroove for actual recording of information;

the first optical disk is incompatible with another type of a recording apparatus which is designed to conduct test recording before actual recording on a test area of a second optical disk repeatedly up to a predetermined number of times and which is designed to successively record the times of the test recording into a count area of the second optical disk such that the final time may be recorded in a predetermined section of the count area;

the first optical disk has a test area corresponding to the test area of the second optical disk and a prepit area corresponding to the count area of the second optical disk, the prepit area being provisionally formed with prepits at least in a section corresponding to the predetermined section of the count area of the second optical disk so as to inhibit said another type of the recording apparatus from conducting the test recording; and a new count area is formed in a part of the test area separately from the prepit area such that the times of the test recording conducted in the test area can be recorded successively into the new count area.

2. A first optical disk having a circular shape formed with a pregroove along a circumferential direction of the circular shape, wherein:

the first optical disk is compatible with one type of a recording apparatus which is designed to irradiate an optical beam onto the optical disk to form pits along the pregroove for actual recording of information;

the first optical disk is incompatible with another type of a recording apparatus which is designed to conduct test recording before actual recording on a test area of a second optical disk repeatedly up to a predetermined number of times and which is designed to successively record the times of the test recording into a count area of the second optical disk such that the final time may be recorded in a predetermined section of the count area;

the first optical disk has a test area corresponding to the test area of the second optical disk and a prepit area corresponding to the count area of the second optical disk, the prepit area being provisionally formed with prepits at least in a section corresponding to the predetermined section of the count area of the second optical disk so as to inhibit said another type of the recording apparatus from conducting the test recording; and the test area is divided into the predetermined number of sections such that the test recording can be successively performed in the respective sections up to the predetermined number of times, the test area containing a predetermined section allocated to the test recording to be performed at the final time, the predetermined section being provisionally formed with prepits effective to inhibit said another type of the recording apparatus from conducting the test recording.

3. The first optical disk according to claim 2, wherein only the predetermined section is provisionally formed with the prepits, and the remaining sections are free of prepits and reserved for the test recording to be conducted by said one type of the recording apparatus.

4. The first optical disk according to claim 2, wherein only the predetermined section is provisionally formed with the prepits, some of the sections except for the predetermined section are assigned to a new count area such that the times of the test recording conducted are recorded successively into the new count area, and the remaining sections are reserved for the test recording to be conducted by said one type of the recording apparatus.

5. A first optical disk having a circular shape formed with a pregroove along a circumferential direction of the circular shape, wherein:

the first optical disk is compatible with one type of a recording apparatus which is designed to irradiate an optical beam onto the optical disk to form pits along the pregroove for actual recording of information;

the first optical disk is incompatible with another type of a recording apparatus which is designed to conduct test recording before actual recording on a test area of a second optical disk repeatedly up to a predetermined number of times and which is designed to successively record the times of the test recording into a count area of the second optical disk such that the final time may be recorded in a predetermined section of the count area;

the first optical disk has a test area corresponding to the test area of the second optical disk and a prepit area corresponding to the count area of the second optical disk, the prepit area being provisionally formed with prepits at least in a section corresponding to the predetermined section of the count area of the second optical disk so as to inhibit said another type of the recording apparatus from conducting the test recording; and a new count area is formed radially inward of the test area while the prepit area is formed radially outward of the test area, such that the times of the test recording conducted in the test area can be recorded successively into the new count area rather than the prepit area.

6. An apparatus constructed for performing an actual recording of information by irradiating an optical beam onto an optical disk which may be manufactured according to either of a first standard and a second standard different from the first standard, and constructed for performing a test recording before the actual recording so as to determine an optimal power of the optical beam which may vary between the first standard and the second standard, the apparatus comprising:

a detecting section that detects whether the optical disk is manufactured according to the first standard or the second standard;

a first control section that executes the test recording in accordance with the first standard to determine the optimal valve of the optical beam under the first standard;

a second control section that executes the test recording in accordance with the second standard to determine the optimal value of the optical beam under the second standard; and a selecting section that selectively activates the first control section when the first standard is detected from the optical disk and otherwise selectively activates the second control section when the second standard is detected from optical disk, wherein the first control section operates before performing a test recording for accessing a first count area which records a history of the test recording conducted past and which is located according to the first standard, such that the first control section controls the optical beam to approach the first count area from a radially inward side thereof as specified by the first standard, and the second control section operates before performing a test recording for accessing a second count area which records a history of the test recording conducted past by the second control section and which is located separately from the first count area according to the second standard, such that the second control section controls the optical beam to approach the second count area from a radially inward side thereof as specified by the second standard.

* * * * *